United States Patent
Isobe

(10) Patent No.: US 7,412,445 B2
(45) Date of Patent: Aug. 12, 2008

(54) CONTENT RETRIEVING DEVICE AND CONTENT RETRIEVING METHOD

(75) Inventor: Shozo Isobe, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 614 days.

(21) Appl. No.: 10/898,330

(22) Filed: Jul. 26, 2004

(65) Prior Publication Data

US 2005/0055378 A1  Mar. 10, 2005

(30) Foreign Application Priority Data

Jul. 28, 2003  (JP)  ............................. 2003-202464

(51) Int. Cl.
*G06F 7/00* (2006.01)
(52) U.S. Cl. ........................................................ 707/9
(58) Field of Classification Search ....................... 707/9
See application file for complete search history.

(56) References Cited

U.S. PATENT DOCUMENTS

2003/0061165 A1*  3/2003  Okamoto et al. ............... 705/52
2006/0156364 A1*  7/2006  Shinkai ....................... 725/115

FOREIGN PATENT DOCUMENTS

JP        09-167113       6/1997
JP        2002-63165      2/2002
JP        2003-122773     4/2003

OTHER PUBLICATIONS

URL http://www.sharp.co.jp/galileo/index.html; SHARP Corporation.

* cited by examiner

*Primary Examiner*—Chong H Kim
(74) *Attorney, Agent, or Firm*—Oblon, Spivak, McClelland, Maier & Neustadt, P.C.

(57) ABSTRACT

A multimedia content retrieving device for retrieving multimedia content stored in a terminal through a network includes a memory that stores a terminal ID of a managing terminal that stores meta information. The meta information includes information relating to the multimedia content including a content ID and a terminal ID of a terminal that stores the content. A the multimedia content retrieving device also includes a retrieving device that inputs a retrieving condition that specifies information relating to the content, an obtaining device that obtains the meta information, a specifying device that specifies the content ID based on the meta information obtained by the obtaining device, and the terminal ID of the terminal storing the content, and a transmitting device that transmits a request for obtaining the content relating to the content ID through the network to the terminal specified by the specifying device.

16 Claims, 15 Drawing Sheets

| ID | CONTENT CLASSIFICATION | TITLE | FILE NAME |
|---|---|---|---|
| 1 | VIDEO CONTENT | NEW PROGRAM A | NVA.mpg |
| 4 | VIDEO CONTENT | GOURMET PROGRAM B | GVB.mpg |

| ID | CONTENT CLASSIFICATION | TITLE | FILE NAME |
|---|---|---|---|
| 2 | VIDEO CONTENT | HOME VIDEO X | HVX.mpg |

Fig. 5

| ID | CONTENT CLASSIFICATION | TITLE | FILE NAME |
|---|---|---|---|
| 3 | VIDEO CONTENT | TRAVEL C | TPC.jpg |

Fig. 6

```
<META_INFORMATION>
  <TERMINAL name="PC">
    <SCREEN_IMAGE_CONTENTS  TERMINAL="PC"  TYPE="BINARY"  ID="1">
      <TITLE>NEWS PROGRAM A</TITLE>
      <FILE_NAME>NVA.mpg</FILE_NAME>
    </SCREEN_IMAGE_CONTENTS>

<SCREEN_IMAGE_CONTENTS  TERMINAL="PC"  TYPE="BINARY"  ID="4">
      <TITLE>GOURMET PROGRAM B</TITLE>
      <FILE_NAME>GVB.mpg</FILE_NAME>
    </SCREEN_IMAGE_CONTENTS>
  </TERMINAL>

<TERMINAL  name="VIDEO CAMERA">
    <SCREEN_IMAGE_CONTETNS  TERMINAL="VIDEO CAMERA"  TYPE="BINARY"  ID="2">
      <TITLE>HOME VIDEO X</TITLE>
      <FILE_NAME>HVX.mpg</FILE_NAME>
    </SCREEN_IMAGE_CONTENTS>
  </TERMINAL>
</META_INFORMATION>
```

Fig. 7

```
<META_INFORMATION>
  <LOCAL_MANAGING_CONTENTS_GROUP  MANAGING_TERMINAL="PC"  LINK_DESTINATION="/META_INFORMATION">
  </LOCAL_MANAGING_CONTENTS_GROUP>

<LOCAL_MANAGING_CONTENTS_GROUP>
    <TERMINAL  name="DIGITAL CAMERA">
      <IMAGE_CONTENTS  TERMINAL="DIGITAL CAMERA"  TYPE="BINARY"  ID="3">
        <TITLE>TRAVEL C</TITLE>
        <FILE_NAME>TPC.jpg</FILE_NAME>
      </IMAGE_CONTENTS>
    </TERMINAL>
  </LOCAL_MANAGING_CONTENTS_GROUP>
</META_INFORMATION>
```

Fig. 8

```
<META_INFORMATION>
  <LOCAL_MANAGING_CONTENTS_GROUP UPDATE FLAG="True" MANAGING_TERMINAL="PC" LINK_DESTINATION="/META_INFORMATION">
    <TERMINAL name="PC">
      <SCREEN_IMAGE_CONTENTS TERMINAL="PC" TYPE="BINARY" ID="1">
        <TITLE>NEWS PROGRAM A</TITLE>
        <FILE_NAME>NVA.mpg</FILE_NAME>
      </SCREEN_IMAGE_CONTENTS>
    </TERMINAL>

<TERMINAL name="VIDEO CAMERA">
      <SCREEN_IMAGE_CONTENTS TERMINAL="VIDEO CAMERA" TYPE="BINARY" ID="2">
        <TITLE>HOME VIDEO X</TITLE>
        <FILE_NAME>HVX.mpg</FILE_NAME>
      </SCREEN_IMAGE_CONTENTS>
    </TERMINAL>
  </LOCAL_MANAGING_CONTENTS_GROUP>

<LOCAL_MANAGING_CONTENTS_GROUP MANAGING_TERMINAL="SERVER">
    <TERMINAL name="DIGITAL CAMERA">
      <IMAGE_CONTENTS TERMINAL="DIGITAL CAMERA" TYPE="BINARY" ID="3">
        <TITLE>TRAVEL C</TITLE>
        <FILE_NAME>TPC.jpg</FILE_NAME>
      </IMAGE_CONTENTS>
    </TERMINAL>
  </LOCAL_MANAGING_CONTENTS_GROUP>
</META_INFORMATION>
```

Fig. 9

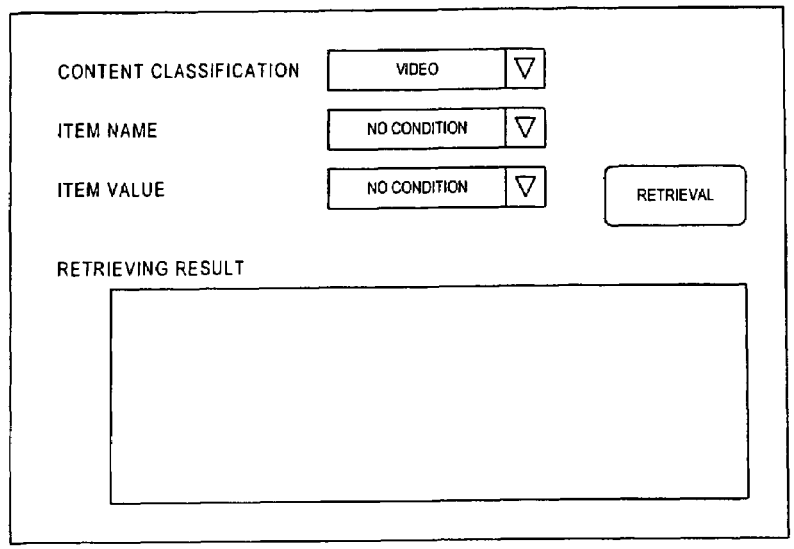

Fig. 10

```
FOR $local_mng_grp IN /META_INFORMATION/LOCAL_MANAGING_CONTENTS_GROUP[@UPDATE_FLAG="True"]
LET $mng_device:=$local_mng_grp/@MANAGING_TERMINAL
LET $link:=$local_mng_grp/@LINK_DESTINATION
RETURN
  <LOCAL_MANAGING_TERMINAL_INFORMATION UPDATE_FLAG="True">
    <MANAGING_TERMINAL>{$mng_device}</MANAGING_TERMINAL>
    <LINK_DESTINATION>{$link}</LINK_DESTINATION>
  </LOCAL_MANAGING_TERMINAL_INFORMATION>
```

Fig. 11

```
<LOCAL_MANAGING_TERMINAL_INFORMATION UPDATE_FLAG="True">
  <MANAGING_TERMINAL>PC</MANAGING_TERMINAL>
  <LINK_DESTINATION>/META_INFORMATION</LINK_DESTINATION>
</LOCAL_MANAGING_TERMINAL_INFORMATION>
```

Fig. 12

```
/META_INFORMATION/TERMINAL/SCREEN_IMAGE_CONTENTS
```

Fig. 13

```
/META_INFORMATION/LOCAL_MANAGING_CONTENTS_GROUP[@MANAGING_TERMINAL="SERVER"]/TERMINAL/SCREEN_IMAGE_CONTENTS
```

Fig. 14

```
<SCREEN_IMAGE_CONTENTS TERMINAL="PC" TYPE="BINARY" ID="1">
  <TITLE>NEWS PROGRAM A</TITLE>
  <FILE_NAME>NVA.mpg</FILE_NAME>
</SCREEN_IMAGE_CONTENTS>

<SCREEN_IMAGE_CONTENTS TERMINAL="PC" TYPE="BINARY" ID="4">
  <TITLE>GOURMET PROGRAM B</TITLE>
  <FILE_NAME>GVB.mpg</FILE_NAME>
</SCREEN_IMAGE_CONTENTS>

<SCREEN_IMAGE_CONTENTS TERMINAL="VIDEO CAMERA" TYPE="BINARY" ID="2">
  <TITLE>HOME VIDEO X</TITLE>
  <FILE_NAME>HVX.mpg</FILE_NAME>
</SCREEN_IMAGE_CONTENTS>
```

Fig. 15

| ID | CONTENT CLASSIFICATION | TITLE | FILE NAME |
|---|---|---|---|
| 2 | VIDEO CONTENT | HOME VIDEO X | HVX.mpg |

Fig. 16

| TERMINAL NAME | ID | CONTENT CLASSIFICATION | TITLE | FILE NAME |
|---|---|---|---|---|
| PC | 1 | VIDEO CONTENT | NEW PROGRAM A | NVA.mpg |
| PC | 4 | VIDEO CONTENT | GOURMET PROGRAM B | GVB.mpg |
| VIDEO CAMERA | 2 | VIDEO CONTENT | HOME VIDEO X | HVX.mpg |

Fig. 17

| ID | CONTENT CLASSIFICATION | TITLE | FILE NAME |
|---|---|---|---|
| 1 | VIDEO CONTENT | NEW PROGRAM A | NVA.mpg |
| 4 | VIDEO CONTENT | GOURMET PROGRAM B | GVB.mpg |
| 2 | VIDEO CONTENT | HOME VIDEO Y | HVX.mpg |

Fig. 20

/META_INFORMATION/LOCAL_MANAGING_CONTENTS_GROUP/SCREEN_IMAGE_CONTENTS[TITLE="HOME VIDEO X"]

Fig. 21

```
<SCREEN_IMAGE_CONTENTS TERMINAL="VIDEO CAMERA" TYPE="BINARY" ID="2">
  <TITLE>HOME VIDEO X</TITLE>
  <FILE_NAME>HVX.mpg</FILE_NAME>
</SCREEN_IMAGE_CONTENTS>
```

Fig. 22

```
/META_INFORMATION/LOCAL_MANAGING_CONTENTS_GROUP/SCREEN_IMAGE_CONTENTS[@ID="2"]
```

Fig. 23

```
<SCREEN_IMAGE_CONTENTS TERMINAL="PC" TYPE="BINARY" ID="2">
  <TITLE>HOME VIDEO Y</TITLE>
  <FILE_NAME>HVX.mpg</FILE_NAME>
</SCREEN_IMAGE_CONTENTS>
```

Fig. 24

CONTENT RETRIEVING DEVICE AND CONTENT RETRIEVING METHOD

CROSS-REFERENCE TO RELATED APPLICATIONS

Priority under 35 U.S.C. § 119 is claimed to Japanese Patent Application No. 2003-202464, filed on Jul. 28, 2003, the disclosure of which is incorporated herein by reference in its entirety.

BACKGROUND OF THE INVENTION

1. Field of the Invention

The present invention relates to a multimedia content retrieving device and a multimedia content retrieving method for retrieving content stored in a terminal.

2. Discussion of the Background

There is a technique for connecting a terminal such as a personal computer (hereinafter called a PC), a portable telephone, a portable terminal such as a PDA (Personal Digital Assistance), or an information terminal such as a TV with a program recorder, etc. to a server by a wired or wireless network, and transferring multimedia content data (hereinafter called content) such as video, music and still images to the terminal via the server. Thus, this technique allows the content such as a program, a photograph, music, etc. to be audio-visualized irrespective of location.

A home server is an example of a server that may be used to provide such a function, and includes a large capacity storage device such as a HDD, or a DVD, etc. and accumulates and manages the content.

The home server controls and manages a terminal device connected to a network constituting a home network.

For example, content such as video or music stored within the home server can be transferred to a PC located in a study, a kitchen and a bedroom using wired or wireless communication by arranging the home server in a sitting room, for example, with a wired or wireless LAN function.

Further, the home server has the role of, so to speak, a control tower for accumulating content and transmitting and receiving content to and from terminals located within the home.

Further, the home server has a function for retrieving and displaying predetermined desirable content among the content accumulated in a memory medium within the terminal connected to the network and a memory medium within the home server.

Meta information describing additional information related to the content is managed by the home server to manage the content accumulated in the memory media and the terminal.

Here, there is a possibility that the amount of meta information for managing the content within each terminal connected by the network may become very large.

As the functions of devices such as digital cameras and portable telephones with camera functions are improved, increased amounts of digital photographs can be stored daily on the home server or the PC terminal.

For example, each member of a family may have a portable telephone with a camera function, and all managing information (i.e., meta information) related to the resulting photo content is managed by the home server. In this case, all the meta information relating to that content is registered and managed within the home server. The home server must update pertinent meta information every time content is added, moved, deleted or copied within the terminal connected by the network or between the terminals. Therefore, there is a problem of an increase in the processing amount of the server.

SUMMARY OF THE INVENTION

Accordingly, one object of the present invention is to provide a novel content retrieving device and a novel content retrieving method able to efficiently manage the meta information related to the content stored on a terminal in the network and to retrieve the content.

Further, another object of the present invention is to provide a novel program for making a computer execute a procedure corresponding to the novel content retrieving device and method, and to provide a novel computer readable recording medium and recording this program on that medium.

In accordance with the present invention, the meta information related to each content within plural terminals connected to the content retrieving device by the network is managed within the content retrieving device (e.g., in a tree shape). Partial meta information (e.g., meta information corresponding to a partial tree) among this meta information is distributed and managed within the terminal. Thus, even when content are frequently added, moved, deleted, or copied, etc. within the terminal connected to the content retrieving device by the network, or between the terminals, it is possible to reduce the number of access times to the meta information held by the content retrieving device in order to manage the content within each terminal, and also to reduce the amount of meta information as a backup object and thereby also reduce the processing load on a server.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspects or features of other embodiments where applicable. The descriptions of aspects, features and/or advantages of particular embodiments should not be construed as limiting other embodiments or the claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a view showing a first example of local content within the video camera terminal;

FIG. 6 is a view showing a first example of local content within the digital camera terminal;

FIG. 7 is a view showing a first example of partial meta information managed within the PC terminal;

FIG. 8 is a view showing a first example of meta information managed within a server;

FIG. 9 is a view showing a second example of meta information managed within the server;

FIG. 10 is a view showing an example of the display of a GUI screen for inputting a retrieving condition and outputting a retrieving result;

FIG. 11 is a view showing an example of a query for obtaining managing terminal information;

FIG. 12 is a view showing an example of obtaining a result of the managing terminal information;

FIG. 13 is a view showing a first example of a query for obtaining partial meta information managed within the PC terminal;

FIG. 14 is a view showing an example of a query for obtaining meta information managed within the server with the server as a managing terminal;

FIG. 15 is a view showing a first example of a retrieving result with respect to the partial meta information of the managing terminal;

FIG. 16 is a view showing an example of an content obtaining result;

FIG. 17 is a view showing an example of a result in which the content obtaining results are integrated;

FIG. 20 is a view showing a second example of local content within the PC terminal;

FIG. 21 is a view showing a second example of a query for obtaining partial meta information managed within the PC terminal;

FIG. 22 is a view showing a second example of a retrieving result with respect to the partial meta information of a managing terminal;

FIG. 23 is a view showing another example of a query for obtaining partial meta information managed within the PC terminal; and FIG. 24 is a view showing another example of a retrieving result with respect to the partial meta information of the managing terminal.

DETAILED DESCRIPTION OF THE PREFERRED EMBODIMENTS

Embodiments of the present invention will next be explained with reference to the drawings.

Meta information used in the present specification includes plural kinds of information relating to content details, such as ID for identifying the content, and the identification information of a terminal storing the content.

Figure 1:
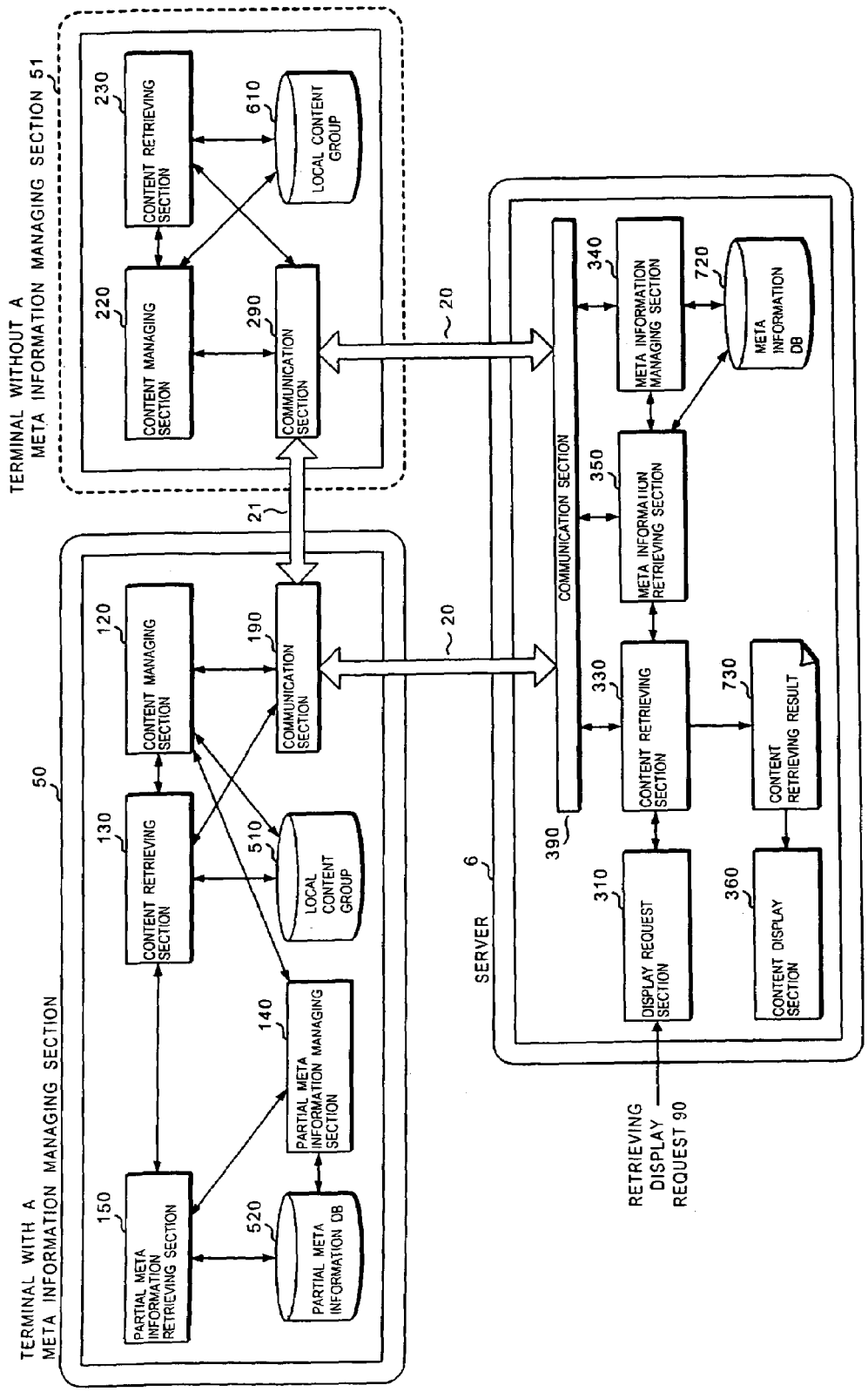
FIG. 1 is a view showing a structure of a content managing system according to a first embodiment of the present invention.

FIG. 1 shows an example of a content managing system in accordance with one embodiment of the present invention.

The content managing system of this embodiment includes a server (i.e., content managing device) 6 and plural terminals 50 and 51 able to communicate with the server 6 through a network 20.

The plural terminals include a first terminal 50 and a second terminal 51. The first terminal 50 has a partial meta information managing function for managing the meta information relating to the content held within another terminal (e.g., the second terminal) and itself. The second terminal 51 does not have a partial meta information managing function.

The content managing system of this example includes at least one first terminal 50 and one second terminal 51. However, alternative embodiments are possible in which no second terminal 51 exists.

The network 20 between the server 6 and each terminal may be a LAN such as a home network, for example.

The network 21 between the first terminal 50 and the second terminal 51 as a managing object of this first terminal 50 may be the same network as the network 20, and may be also a network different from the network 20.

The terminals 50 and 51 may include a PC terminal, an information terminal, a portable terminal, or other electrical appliances, for example.

As shown in FIG. 1, the server 6 of this embodiment has a display request section 310, a content retrieving section 330, a meta information retrieving section 350, a meta information managing section 340, a content display section 360, a communication section 390 and a meta information database (meta information DB) 720.

The meta information DB 720 stores meta information relating to content (i.e., multimedia content data) stored to a local content group 510 within each first terminal 50 and a local content group 610 within each second terminal 51.

The display request section 310 includes an interface for inputting a retrieving display request 90 from a user, and the inputted retrieving display request signal is transmitted to the content retrieving section 330.

The content retrieving section 330 performs processing for extracting a meta information retrieving condition from the retrieving display request signal transmitted from the display request section 310, and transmitting the meta information retrieving condition to the meta information retrieving section 350.

Further, the content retrieving section 330 performs processing for receiving the meta information transmitted from the meta information retrieving section 350 as a retrieving result.

Further, the content retrieving section 330 performs processing for transmitting a content retrieving request signal for executing content retrieval to the first terminal 50 and the second terminal 51 via the communication section 390 and the network 20 based on the received meta information, and giving instructions of the retrieval of the content.

Further, the content retrieving section 330 performs processing for integrating the content retrieving result transmitted from the first terminal 50 and the second terminal 51 and acquiring the content retrieving result as content retrieving result 730.

The meta information managing section 340 adds, updates and deletes the meta information with respect to the meta information DB 720.

Further, the meta information managing section 340 performs processing for managing update information of the meta information.

Further, the meta information managing section 340 performs processing for receiving the meta information according to the condition of the retrieval executed by the meta information retrieving section 350 from the meta information DB 720 through the meta information retrieving section 350.

Further, the meta information managing section 340 performs processing to judge whether or not reference link information to the first terminal 50 is included within the received meta information.

Further, the meta information managing section 340 performs processing for transmitting the information of a terminal as a retrieving object of the content and meta information (hereinafter also called partial meta information) managed by this terminal to the meta information retrieving section 350 based on the result of the above judgment. Namely, when it is judged that the reference link information is included, the meta information managing section 340 performs processing for giving instructions to the meta information retrieving section 350 so as to execute further retrieval with respect to a partial meta information DB 520 within the terminal 50 corresponding to a link destination shown by this reference link information.

The meta information retrieving section 350 calculates the meta information according to the condition from the meta information DB 720 based on the meta information retrieving condition transmitted from the content retrieving section 330, and transmits this meta information to the meta information managing section 340.

Further, the meta information retrieving section 350 transmits a partial meta information retrieving request signal and retrieval instructions requiring the retrieval of the partial meta information to the first terminal 50 as a retrieving object via the communication section 390 and the network 20 when instructions for executing further retrieval are given from the meta information managing section 340.

Further, the meta information retrieving section 350 calculates the meta information as a retrieving result from the meta information transmitted from the meta information DB 720 or the partial meta information DB 520 within the first terminal 50, and transmits this calculated meta information to the content retrieving section 330.

The content display section 360 receives the content retrieving result 730 from the content retrieving section 330, and displays this retrieving result in a display.

The content display section may also display attributes, etc. of the content instead of the content itself in accordance with a content classification. For example, in the case of video content, a list of video scenes may also be displayed as thumbnails. In the case of music and photographs, a title list of the music and the photographs may also be displayed.

The communication section 390 transmits the content retrieving request signal or the meta information retrieving request signal received from the content retrieving section 330 or the meta information retrieving section 350, respectively, to a communication section 190 within the first terminal 50 or a communication section 290 within the second terminal 51 via the network 20.

Further, the communication section 390 receives the content retrieving result or the meta information retrieving result transmitted from the communication section 190 within the first terminal 50 or the communication section 290 within the second terminal 51 via the network 20, and respectively transmits the content retrieving result or the meta information retrieving result to the content retrieving section 330 or the meta information retrieving section 350, respectively.

In addition, the server 6 may include a function for managing the meta information of the second terminal 51.

Further, the server 6 may include a local content group and a content managing section. In this case, the server 6 itself also performs terminal functions.

Next, as shown in FIG. 1, the first terminal 50 of this embodiment has a content managing section 120, a content retrieving section 130, a partial meta information managing section 140, a partial meta information retrieving section 150, the communication section 190, the local content group 510 and the partial meta information database (i.e., partial meta information DB) 520.

For example, the local content group 510 stores various content represented by document data, a computer program, a broadcasting program or images captured from a video, a picture photographed by a digital camera, a music album, and a musical piece, etc.

The partial meta information DB 520 stores meta information relating to the content stored to the local content group 510, and meta information relating to the content stored to a local content group 610 of the second terminal 51 as a managing object.

The content managing section 120 adds, updates and deletes content with respect to the local content group 510. In this case, the content managing section 120 transmits a partial meta information update request signal for requiring the update of the partial meta information to the partial meta information managing section 140, and gives instructions for updating the partial meta information DB 520 and the partial meta information update information.

The content managing section 120 preferably transmits a partial meta information update request signal to the partial meta information managing section 140 as rapidly as possible when the local content group 510 is updated.

When the content retrieving section 130 receives the content retrieving request signal from the server 6 through the communication section 190, the content retrieving section 130 executes retrieval processing of the local content group 510.

Further, the content retrieving section 130 transmits the above meta information retrieving request signal to the partial meta information retrieving section 150 with respect to the meta information retrieving request signal from the server 6 transmitted from the communication section 190, and gives instructions of the retrieving execution to the partial meta information DB 520.

The partial meta information managing section 140 adds, updates and deletes the partial meta information with respect to the partial meta information DB 520.

Further, the partial meta information managing section 140 performs processing for updating the update information of the partial meta information.

Further, the partial meta information managing section 140 performs processing for updating the partial meta information DB 520 based on the partial meta information update request signal from the content managing section 120 and the content managing section 220 of the second terminal 51 as a managing object.

The partial meta information managing section 140 transmits the meta information update request signal for requiring the update of the meta information to the server 6 in predetermined timing, and the server 6 receiving this meta information update request signal may update the pertinent meta information.

For example, the predetermined timing may be set to various timings such as periodic timing (e.g., once a day), a power turning-on time of the terminal, a connecting time of the terminal to the network 20, and combinations thereof, etc.

The partial meta information retrieving section 150 receives the meta information retrieving request signal from the content retrieving section 130, and executes the retrieval of the meta information according to the retrieving condition with respect to the partial meta information DB 520, and transmits the meta information obtained as this result to the content retrieving section 130.

The communication section 190 transmits the content retrieving result or the meta information retrieving result received from the content retrieving section 130 and the partial meta information retrieving section 150 to the communication section 390 within the server 6 via the network 20.

Further, the communication section 190 receives the content retrieving request signal or the meta information retrieving request signal transmitted from the communication section 390 within the server 6 via the network 20, and respectively transmits the content retrieving request signal or the meta information retrieving request signal to the content retrieving section 130 or the meta information retrieving section 150 together with the retrieving instructions.

Various embodiments are possible for the the first terminal 50.

For example, the first terminal 50 may not include a local content group 510 and includes a function for managing only the meta information relating to the second terminal 51. Conversely, the first terminal 50 may include a function for managing only the meta information relating to itself.

Further, for example, the first terminal 50 may include a function for managing the meta information relating to another terminal in addition to the function for managing the meta information relating to itself.

Next, as shown in FIG. 1, the second terminal 51 has a content managing section 220, a content retrieving section 230, a communication section 290 and a local content group 610. This second terminal 51 differs from the first terminal 50 in that the second terminal 51 itself has no function for managing the partial meta information.

The local content group 610 is similar to the local content group 510 of the terminal 50. For example, the local content group 610 stores various content represented by document data, a computer program, a broadcasting program or an image captured from a video, a picture photographed by a digital camera, a music album and a musical piece, etc.

The content managing section 220 adds, updates and deletes content with respect to the local content group 610. Further, at this time, the content managing section 220 transmits the above partial meta information update request signal to the partial meta information managing section 140 of the first terminal 50 with the itself as a managing object, updates the partial meta information DB 520, and gives instructions of the update of the partial meta information.

When the local content group 610 is updated, the content managing section 220 preferably transmits the partial meta information update request signal to the partial meta information managing section 140 of the first terminal 50 with the self terminal as a managing object as rapidly as possible.

When the content retrieving section 230 receives the content retrieving request signal from the server 6 through the communication section 290, the content retrieving section 230 executes the retrieval processing of the local content group 610.

The communication section 290 transmits the local content retrieving result received from the content retrieving section 230 to the communication section 390 within the server 6 via the network 20.

Further, the communication section 290 receives the content retrieving request signal transmitted from the communication section 390 within the server 6 via the network 20, and transmits the content retrieving request signal to the content retrieving section 230.

Procedures for adding, updating and deleting the meta information (e.g., partial meta information) in the meta information managing section 340 and the partial meta information managing section 140 may be performed by using a publicly known technique. Japanese Patent Application (Kokai) No. 2002-297601 discloses an example of this publicly known technique.

An example of the processing operation of the content retrieving device will next be explained.

Figure 2:
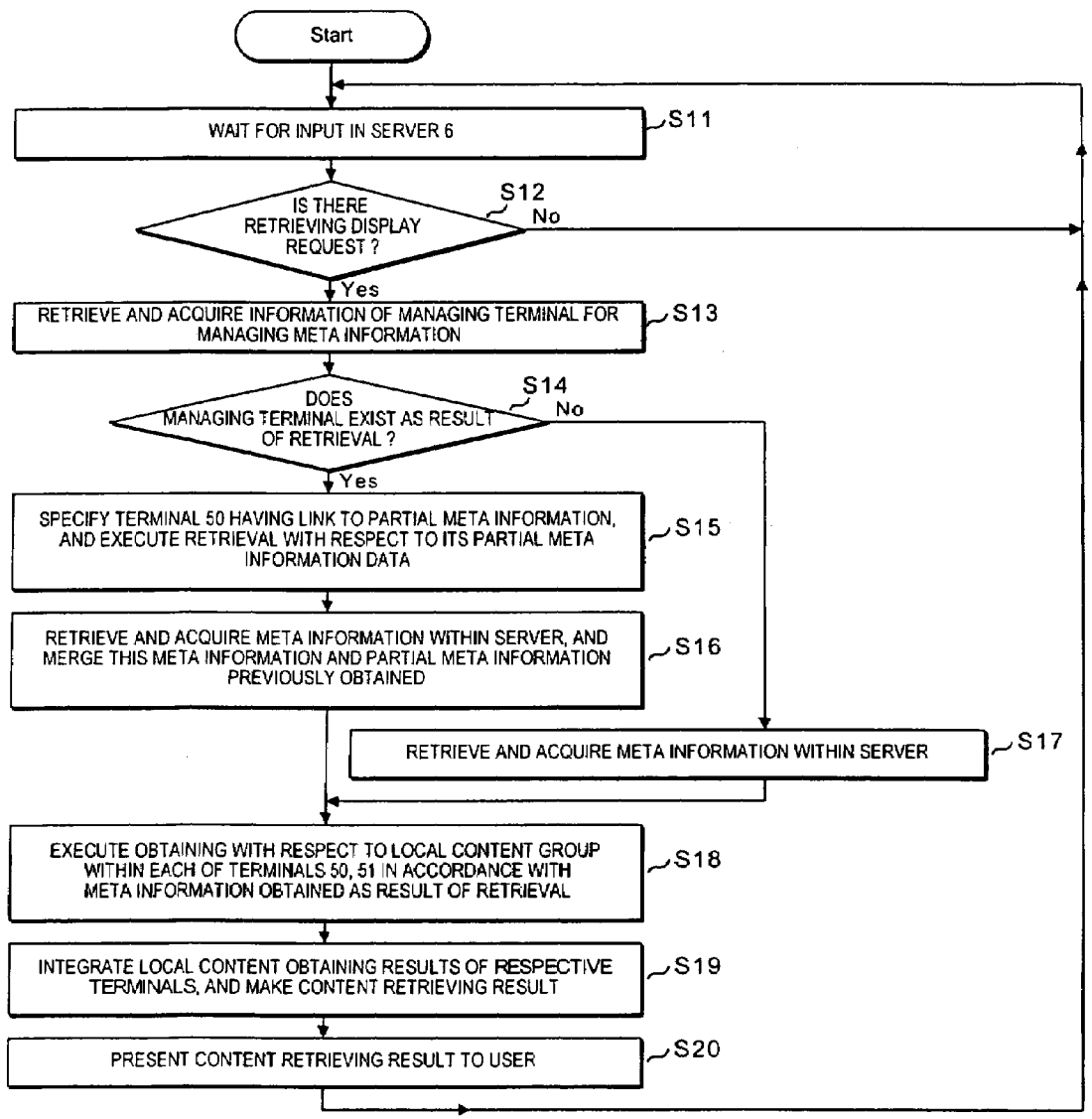
FIG. 2 is a flow chart showing a processing procedure of a content retrieving device according to the first embodiment of the present invention.

FIG. 2 shows one example of a flow chart showing the processing operation of this content retrieving device.

Figures 3, 4:
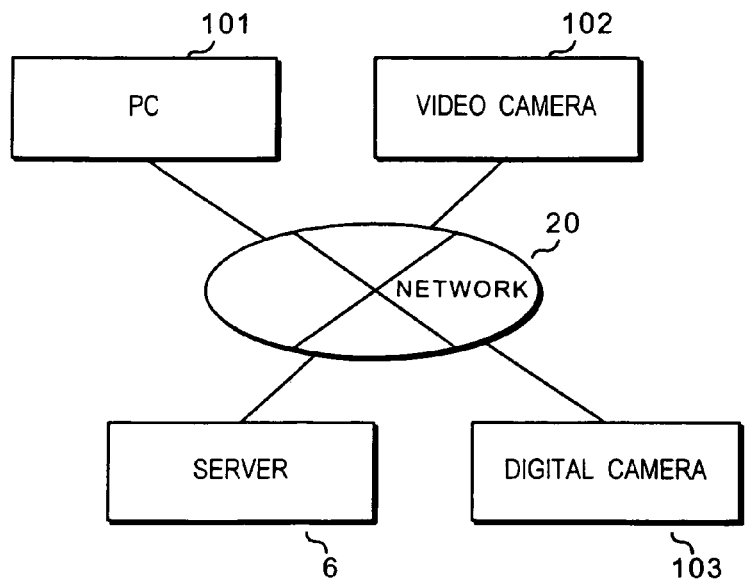
FIG. 3 is a view showing an example of terminals connected to a server.
FIG. 4 is a view showing a first example of local content within the PC terminal.

In this example, as shown in FIG. 3, three terminals including PC 101 as the first terminal 50 having the partial meta information managing function, video camera 102 as the second terminal 51 having no partial meta information managing function, and digital camera 103 each connected to the server 6 by the network 20.

Further, this example illustrates a user operating the interface of the server 6 and retrieving and displaying a list of screen image content in the PC terminal 101, the video camera 102 and the digital camera 103.

FIGS. 4 to 6 respectively show examples of content stored to the local content group within each of the three terminals including the PC 101, the video camera 102 and the digital camera 103.

As shown in FIG. 4, the PC 101 holds two items, "news program A" and "gourmet program B," which are classified as video content within the local content group 510.

Further, as shown in FIG. 5, the video camera 102 holds one content item, "home video X," which is classified as video content within the local content group 610.

Further, as shown in FIG. 6, the digital camera 103 holds one content item, "travel C," which is classified as video content within the local content group 610.

In this example, the meta information relating to the local content group within the PC 101 and the meta information relating to the local content group within the video camera 102 are managed as partial meta information within the PC 101.

Further, the meta information relating to the local content group within the digital camera 103 is managed within the server 6.

Further, the server 6 is uniquely responsible for management of the meta information group relating to the local content group within each of these three terminals.

FIG. 7 shows one example of the partial meta information managed within the PC 101 as a first terminal.

In this example, the meta information for each described terminal is arranged within a range surrounded by a meta information tag. With respect to the meta information relating to one terminal, the meta information for each described content is arranged within a range surrounded by a terminal tag that includes a terminal name as an attribute.

Further, with respect to the meta information of each content, information relating to the content is structurally arranged within a range surrounded by a tag showing the content classification including the terminal name, a data type and content ID as attributes.

FIG. 8 shows a first example of the meta information managed within the server 6, and FIG. 9 similarly shows a second example of this meta information.

FIG. 8 shows an example in which no copy of the partial meta information (the meta information of the PC 101 and the meta information of the video camera in this example) managed in the first terminal 50 (PC 101 in this example) having a partial meta information managing function is held within the server 6. FIG. 9 shows an example in which the above copy is held within the server 6.

Namely, when FIGS. 8 and 9 are compared with each other, information for each described local managing content group is arranged within a range surrounded by the meta information tag in each case.

However, with respect to the PC 101 as a terminal (hereinafter also called a managing terminal) for managing the partial meta information, only reference link information is described within the tag in FIG. 8, and no copy of the meta information is described. In contrast to this, in FIG. 9, the copy of the meta information is described in addition to the reference link information.

Further, in the example of each of FIGS. 8 and 9, the meta information is described with respect to the digital camera 103.

FIG. 8 shows that no managing terminal is described within the local managing content group tag, and information not described with respect to the managing terminal within the local managing content group tag is the meta information directly managed by the server 6. In contrast to this, FIG. 9 shows that MANAGING_TERMINAL="SERVER" is clearly described within the local managing content group tag. FIGS. 8 and 9 differ from each other in this point.

In this example, the meta information is described in an XML format, but is not limited to this format.

In the following, a case using the meta information holding the copy of the partial meta information managed within the managing terminal as shown in FIG. 9 is explained as an example.

In FIG. 9, the local content group held by the server 6 includes three content items including video content "new program A" of the PC 101, video content "home video X" of the video camera 102, and image content "travel C" of the digital camera 103. However, newest content of the PC 101 and the video camera 102 are managed by the PC 101, and a link destination to the PC 101 corresponding to this partial meta information shows "/META_INFORMATION" within the meta information DB corresponding to the local content group in the PC 101.

Further, the example shows that newest content in the digital camera 103 are managed by the server 6.

Further, the example also shows an attribute "UPDATE_FLAG" indicating whether or not information unreflected in the server 6 with respect to changing content of the meta information is included within the meta information managed by the PC 101 as a first terminal.

In this example, when the attribute value of the update flag is "True", the unreflected meta information is included. In contrast to this, when the attribute value is "False", no unreflected meta information is included.

For example, the attribute value of the update flag is set as follows.

When the partial meta information managing section 140 of the first terminal 50 executes the update of the partial meta information DB 520, the partial meta information managing section 140 transmits to the server 6 a notification message showing that the partial meta information DB 520 is updated.

The server 6 receiving this notification message changes the attribute value of the update flag of the pertinent meta information to "True".

In this case, when the partial meta information managing section 140 of the first terminal 50 executes the update of the partial meta information DB 520 and timing for transmitting a meta information update request signal to the server 6 is attained within a predetermined time, the partial meta information managing section 140 may also transmit the meta information update request signal after the attainment of this timing instead of the transmission of the above notification message.

When the server 6 receives the meta information update request signal from the first terminal 50, the server 6 updates the pertinent meta information and changes the attribute value of the update flag to "False".

In an alternative possible embodiment, the meta information is always treated as (possibly) un-updated information without arranging the update flag (the attribute value of the update flag is always treated as "True").

Further, as shown in FIG. 8, when the meta information including no copy of the partial meta information managed within the first terminal 50 is adopted, no update flag is arranged and the meta information is always treated as (possibly) un-updated information.

In this example, it is assumed that "gourmet program B" is recorded to the PC 101 as a new program, and the meta information corresponding to this video content is reflected in the partial meta information DB 520 within the PC 101 as shown in FIG. 7, but is not yet reflected in the meta information DB 720 within the server 6.

In the examples of FIGS. 8 and 9, for brevity of the explanation, only one PC 101 and server 6 are shown in the terminal for managing the local content group. However, when plural managing terminals exist, in addition to server 6, information for each described managing terminal (i.e., every local managing content group) is arranged within the meta information tag in FIG. 9.

An example of a processing operation of a content retrieving device according to the present invention will next be explained with reference to FIG. 2.

First, the server 6, connected to each of the terminals 50, 51 through the network 20, waits in a wait state for a retrieving display request from a user (step S11).

FIG. 10 shows one example of a GUI screen for setting a condition relating to the retrieving display request by the user.

This example shows performing the retrieving display request of obtaining and displaying a content item classified as video content from the local content group within each terminal will be explained.

For example, the user selects "video" in content classification and "no condition" with respect to the item name and the item value from a drop down menu in the GUI shown in FIG. 10, and inputs a setting condition by pushing-down a retrieving button, for example the button labeled "retrieval."

The server 6 checks the existence of the input of the retrieving display request performed by the user in the state of step S11 (step S12). If there is no retrieving display request, operation is returned to the step S11. In contrast to this, if there is a retrieving display request, operation proceeds to a step S13.

In the step S13, the server 6 retrieves and acquires content conformed to the meta information retrieving condition calculated from the retrieving display request obtained in the step S12 among the meta information corresponding to each terminal under sole management of the server.

First, a query (i.e., retrieving condition) for the meta information retrieval corresponding to the setting condition is generated based on the setting condition set as mentioned above.

Here, the query for the meta information retrieval is issued to both the managing terminal for managing the local content group and the server 6.

Therefore, a query for obtaining information of the managing terminal holding the managing information is issued to the meta information DB 720 within the server 6 in order to know which managing terminal holds the newest managing information relating to the local content group of each terminal at the present time.

FIG. 11 shows one possible example of the query for obtaining the managing terminal information. FIG. 12 shows one possible example of results obtained by applying this query.

In the following explanation, W3C standard query description language XQuery (see URL: http://www.3.org/TR/ xquery for more information) is used, but the present invention is not limited to this XQuery.

The meaning of the query shown in FIG. 11 is as follows.

(First line: retrieving range) Content showing that the update flag is "True" (i.e., the newest managing information lies on the managing terminal side instead of the server 6) for each local managing content group substituted one by one as a value of $local_mng_grp by using a FOR paragraph, and the following steps of the respective lines are applied with respect to each $local_mng_grp.

(Second line: value substitution) The value of an attribute tag "MANAGING_TERMINAL" of the $local_mng_grp is obtained as a text value by using a LET paragraph, and these values are substituted into and stored in a list $mng_device one by one.

(Third line: value substitution) The value of an attribute tag "LINK_DESTINATION" of the $local_mng_grp is obtained as a text value by using the LET paragraph, and these values are substituted into and stored in a list $link one by one.

(Fourth and subsequent lines: result transmission) The values of lists $local_mng_grp and $link calculated in the steps of the second and third rows are respectively surrounded by element tags "MANAGING_TERMINAL" and "LINK_DESTINATION" one by one, and these values are transmitted as retrieving results surrounded by an element tag "LOCAL_MANAGING_TERMINAL_INFORMATION".

In this example, the number of "LOCAL_MANAGING_CONTENTS_GROUP" element tags corresponding to the query retrieving condition of FIG. 11 is one, and this element tag is transmitted as one "LOCAL_MANAGING_TERMINAL_INFORMATION" element tag, as shown in FIG. 12.

Such a retrieving result of the managing terminal information indicates that one portion of the meta information held within the server 6 is managed by the PC 101 as a managing terminal.

The server 6 judges whether or not a managing terminal holding the newest managing information relating to the local content group of each terminal at the present time exists based on the managing terminal information acquired in this way (step S14).

In step S14 of this example, the server 6 retrieves and obtains the partial meta information held in the managing terminal if the managing terminal exists, and only the meta information within the server 6 may be set to a retrieving object if no managing terminal exists.

Accordingly, when there is a managing terminal as the retrieving result (in the case of Yes in the step S14), the server 6 specifies the managing terminal in which a link to the partial meta information exists, and executes the retrieval with respect to the partial meta information managed by this specified managing terminal (step S15).

Further, the server 6 executes the retrieval with respect to the meta information (except for the meta information in which the attribute value is "True") managed by the server 6, and integrates these retrieving results of the partial meta information (step S16).

The server 6 uses this integrated result in subsequent processing.

At this time point, all the partial meta information relating to the managing terminal may also be obtained and flashed (written back) with respect to the meta information DB 720. In this case, the update flag in the pertinent meta information is updated to "False".

In contrast to this, when no managing terminal exists as the retrieving result (in the case of No in the step S14), the server 6 executes the retrieval with respect to the meta information (except for the meta information in which the attribute value is "True") managed by the server 6 (step S17).

The server 6 uses this retrieving result in subsequent processing.

In step S13, the server 6 applies a retrieving query for obtaining the ID of the managing terminal managing the partial meta information as shown in FIG. 11 to the meta information DB 720.

The query shown in FIG. 11 obtains all the values of "MANAGING_TERMINAL" and "LINK_DESTINATION" attributes with respect to the content showing that the attribute value of the update flag is "True" among a path "/META_INFORMATION/LOCAL_MANAGING_CONTENTS_GROUP"

The retrieving result of the terminal ID (plural terminal IDs may also be set) of the managing terminal managing the partial meta information corresponding to this query is provided as shown in FIG. 12, and it is known that the managing terminal is "PC" and the link destination is "/META_INFORMATION".

This result indicates that the judgment in step S14 is yes, and the server 6 performs the processing of steps S15 and S16.

In the step S15, the server 6 executes the retrieval of the partial meta information using the query shown in FIG. 13 with respect to the partial meta information DB 520 within the managing terminal managing the partial meta information calculated as mentioned above, i.e., the PC 101.

Further, the server 6 issues the query shown in FIG. 14 to the meta information DB 720 within the server 6 in the step S15.

The server 6 acquires a retrieving result (including the meta information relating to three content items) with respect to the partial meta information of the managing terminal shown in FIG. 15, and a retrieving result (the retrieving result becomes an empty set since there is no pertinent meta information) with respect to the meta information within the server 6, and integrates these retrieving results (step S16).

The results of this integration are similar to those in FIG. 15.

If the meta information shown in FIG. 15 is obtained, the content retrieving section 330 within the server 6 specifies the ID (ID=1, ID=2 and ID=4 in the case of this example) of content to which the content retrieval should be applied, and a terminal (terminal="PC" with respect to ID=1 and ID=4, and terminal="video camera" with respect to ID=2 in the case of this concrete example) including this ID on the basis of this meta information, and executes obtaining of the respective content with respect to the respective terminals (step S18).

A publicly known technique may be used in the retrieving display of local content based on the meta information.

The content items are here obtained in accordance with, for example, a UPnP protocol by utilizing the URL corresponding to a file storing place of each content.

The obtaining results of content items with ID=1 and ID=4 in the PC 101 are provided as shown in FIG. 4, and the obtaining results of content with ID=2 in the video camera 102 are provided as shown in FIG. 16.

The server 6 integrates the content retrieving results transmitted from these respective terminals, and makes content retrieving result 730 (step S19).

FIG. 17 shows the details of content corresponding to the result in which these content retrieving results are integrated. In this example, as shown in FIG. 17, these content include "news program A", "gourmet program B" and "home video X".

The server 6 finally displays the above content retrieving result 730 in the display as the content display section 360 (step S20).

As mentioned above, the method of the content display may be applied in accordance with the classification of the content.

For example, in the case of the video content, a thumbnail, i.e., a list of video scenes may be displayed instead of the video content themselves. In the case of music and photographs, a title list may be displayed.

As explained above, in accordance with this embodiment, the number of access times to the server can be reduced in the addition, the movement and the copy of the meta information in the management of the meta information relating to the content. Thus, the load of server processing can be reduced.

Other embodiments will next be explained emphasizing different points.

Figure 18:
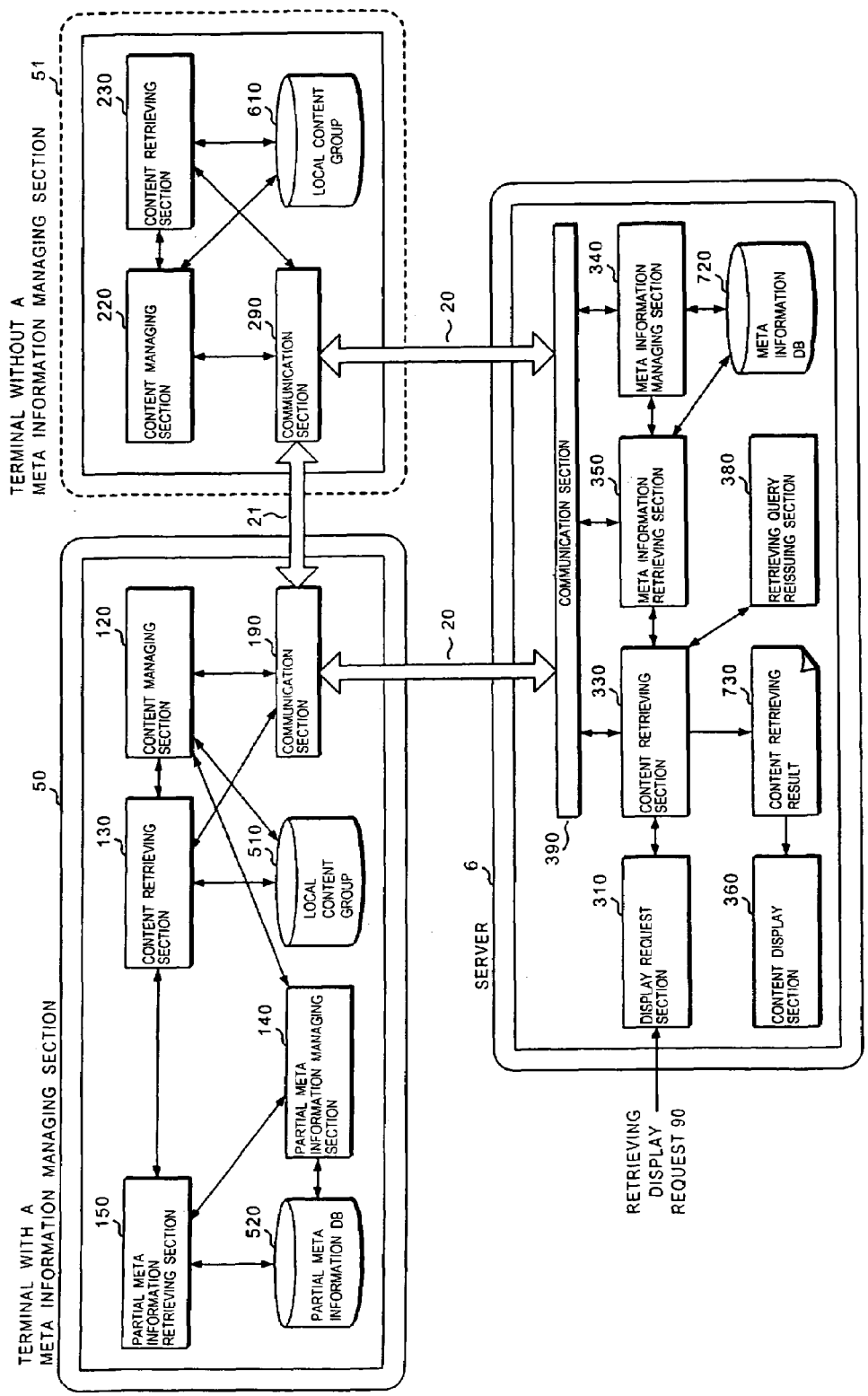
FIG. 18 is a view showing a structure of a content managing system in accordance with a second embodiment of the present invention.

FIG. 18 shows an example of a content managing system relating to a second embodiment of the present invention.

As can be seen from the comparison of FIGS. 18 and 1, this embodiment differs from the previous embodiment in that the server 6 further includes a retrieving query reissuing section 380.

A content retrieving section 330 of the server 6 of this embodiment has the following functions in addition to the function of the content retrieving section 330 of the previous embodiment. Namely, when the content retrieving section 330 executes content retrieval with respect to the terminals 50, 51 and fails in the content retrieval because the power source of a certain terminal is turned off, etc., the content retrieving section 330 has a function for judging whether or not a copy or a digest of content of the certain terminal exists in a terminal different from the certain terminal, and requesting the reissue of a retrieving query with respect to the different terminal from the retrieving query reissuing section 380 when the copy or the digest exists. The content retrieving section 330 also has a function for receiving a query for re-retrieval transmitted from the retrieving query reissuing section 380, and again executing the retrieval with respect to the different terminal.

The retrieving query reissuing section 380 of the server 6 of this embodiment generates a retrieving query with respect to the copy or the digest of predetermined desirable content based on the request of the reissue of the retrieving query received from the content retrieving section 330, and transmits the generated retrieving query to the content retrieving section 330.

The processing operation of the content retrieving device will next be explained by using an example.

Figure 19:
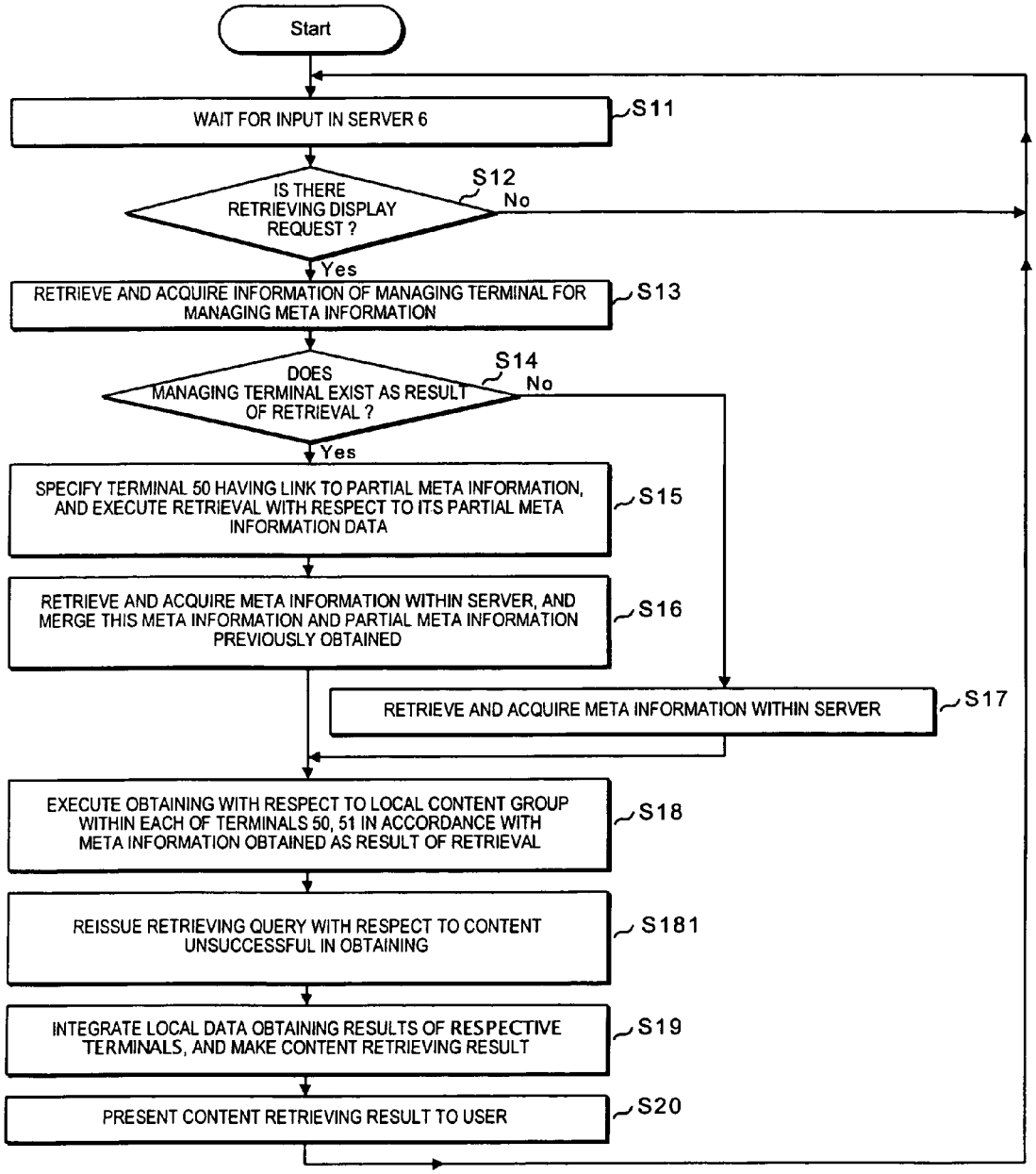
FIG. 19 is a flow chart showing a processing procedure of a content retrieving device in accordance with the second embodiment of the present invention.

FIG. 19 shows one example of a flow chart showing the processing operation of this content retrieving device.

The processing flow of a content managing device of this embodiment differs from the processing flow in the first content managing device in that, when the content managing device fails in the content retrieval for reasons of turning-off of the power source of a terminal, etc. after the execution of the step S18 in the processing flow in the content managing device shown in FIG. 19, the content managing device executes a step S181 for again issuing the retrieving query with respect to another terminal having the copy or the digest of these content.

Here, as an example according to this embodiment, the local content groups within the PC 101 and the video camera 102 are respectively set as shown in FIGS. 20 and 5.

Namely, it is assumed that video content HVX.mpg, entitled "home video X," in the video camera 102 are copied to the PC 101, and only the title is rewritten to "home video Y".

The ID of the original content and the ID of content obtained by copying the original content are set to the same value. When the content are copied, it is possible to easily construct a system for taking over the same content ID.

Further, it is assumed that the example used in this embodiment has the same content holding condition as the example used in the previous embodiment except that the above content are copied.

In this case, it is also assumed that all changes in the meta information in the managing terminal are reflected in the meta information DB 720 within the server 6.

A list of content entitled "home video X" among the video content in each terminal is retrieved and displayed by operating the interface of the server 6 by a user, for example. Further, in the following example, the power source of the video camera 102 is turned off at the retrieving time.

Steps S1 to S4 are similar to those in the previous embodiment.

When the server 6 judges that a managing terminal exists in the step S14, the server 6 issues a query to acquire meta information as shown in FIG. 21 in a step S15.

In a step S16, the server 6 then obtains the meta information shown in FIG. 22 as a retrieving result of the meta information.

As shown in FIG. 22, the existence of video content entitled "home video X" within the video camera 102 is confirmed.

However, in this example, since the power source of the video camera 102 is turned off as mentioned above, the retrieving acquirement of the video content in the step S18 is unsuccessful.

The server 6 refers to the ID of the content from the meta information obtained in FIG. 22, and obtains content ID=2.

The server 6 issues a query for retrieving the meta information relating to content having a tag value="2" of "ID" as shown in FIG. 23 to both the managing terminal for managing the local content group and the server 6 (step S181), and obtains the meta information as shown in FIG. 24 as a retrieving result.

Thus, it is confirmed that the content having the title="home video Y," as a copy of the desired content, exists within the PC 101, and it is known that content can be retrieved and obtained.

Next, if the server 6 obtains the meta information shown in FIG. 24, the server 6 specifies the ID (ID=2 in the case of this example) of content to which the content retrieval should be applied, and a terminal (terminal="PC" in the case of this example) including this ID based on this meta information, and executes obtaining of the respective content with respect to the respective terminals (step S181).

The server 6 then integrates the content retrieving results transmitted from the terminals, and makes content retrieving result 730 (step S19). In this example, the content having the title="home video Y" is made.

The server 6 displays the obtained content retrieving result 730 in the display as the content display section 360 (step S20).

The above example describes a method for specifying the existence of the copy of content unsuccessfully retrieved. However, the existence of a processed object such as a digest of the content, etc. is similarly specified. For example, this specifying can be realized by a similar method by separately defining the original content ID at a recording time point in addition to the content ID finally issued.

In the above description, the case that the power source of a terminal is turned off is used as a case in which the content obtaining within the terminal is unsuccessful. However, no unsuccessful cause is limited to this case. For example, various cases such as a case in which communication is unsuccessful when a home server and each terminal are connected by a network in wireless communication and are separated by 10 meters or more in distance from each other as in a Bluetooth, etc. are considered.

As explained above, in accordance with this embodiment, even when content are frequently copied and moved between terminals connected to the server by the network, it is possible to reduce the number of access times to the meta information held in the server to manage the content within each terminal, and the meta information amount as a backup object so that the processing load of the server can be reduced.

Further, even when one portion of the terminal fails in the retrieval obtaining of content by turning-off the power source, etc., a user can retrieve, obtain and regenerate predetermined desirable content as rapidly as possible by retrieving and obtaining a copy and a digest of this content from another terminal.

Each of the above functions can be also realized by describing this function as software and processing this function by a computer having a suitable mechanism.

Further, this embodiment can be also executed as a program for making a computer execute a predetermined means, a program for making the computer function as a predetermined means, or a program for making the computer realize a predetermined function. In addition, this embodiment can be also executed as a recording medium readable by the computer and recording this program.

The invention claimed is:

1. A content retrieving method for retrieving content stored in a terminal through a network, and said content retrieving method comprising:
    storing a second terminal ID of a managing terminal that stores a meta information, said meta information including plural information relating to said content including a content ID that identifies said content and a first terminal ID of a terminal that stores the content;
    inputting a retrieving condition that specifies at least one information in the plural information relating to said content;
    obtaining the meta information that includes the at least one information in said retrieving condition from the managing terminal having the second terminal ID stored in storing;
    specifying said content ID based on the meta information obtained by the obtaining, and specifying the first terminal ID of the terminal storing the content; and
    transmitting a request for obtaining the content relating to said content ID specified by said specifying through said network to the terminal having the first terminal ID specified by the specifying.

2. The content retrieving method according to claim 1, wherein said storing stores said second terminal ID, a copy of said meta information, and a state control information that is set to one of a first state and a second state, the first state indicating the copy of the meta information is equal to a newest meta information stored on the managing terminal having the second terminal ID and the second state indicating no copy of the meta information is equal to the newest meta information stored on the managing terminal having the second terminal ID, and
    said obtaining obtains said meta information from said storing instead of from the managing terminal having the second terminal ID when said control information is set to the first state.

3. The content retrieving method according to claim 2, further comprising:
    receiving notification information showing said second state from said managing terminal through said network; and
    setting the control information relating to said managing terminal among the control information stored to said storing to said second state when said notification information is received by the receiving.

4. The content retrieving method according to claim 3, further comprising:
    obtaining the newest meta information from said managing terminal through said network; and
    updating the meta information relating to said managing terminal among the meta information stored in said storing to the obtained newest meta information and changing said corresponding control information to said first state when the newest meta information is obtained by the obtaining.

5. The content retrieving method according to claim 1, wherein said storing also stores the meta information that includes the plural information relating to the content stored into the terminal to be directly managed, and also stores the first identification information of the terminal storing these content with respect to the terminal to be directly managed, and
    said obtaining also obtains the meta information that includes the at least one information in said retrieving condition among the meta information stored by said storing with respect to the terminal to be directly managed.

6. The content retrieving method according to claim 1, wherein the plural information in said meta information includes at least information showing a classification of the content relating to the meta information, information showing a title of the content, and information showing a file name of the content.

7. The content retrieving method according to claim 1, further comprising:
    receiving content relating to said request from the terminal transmitting said request; and
    presenting information relating to the content received by the receiving.

8. The content retrieving method according to claim 1, wherein the meta information includes the first identification information of the terminal storing a copy or a digest of an identified content when the content relating to said meta information is the copy or the digest of the identified content,
    said obtaining obtains the meta information relating to said copy or digest when said identified content cannot be received by said receiving although the request for obtaining said identified content is transmitted to the terminal storing said identified content by said transmitting through said network,
    said specifying specifies the first terminal ID of the terminal storing said copy or digest based on the meta information obtained by said obtaining, and
    said transmitting transmits the request for obtaining said copy or digest to the terminal having the first terminal ID through said network.

9. A content retrieving device for retrieving content stored in a terminal through a network, said content retrieving device comprising:

a memory configured to store a second terminal ID of a managing terminal that stores a meta information, said meta information including plural information relating to said content including a content ID that identifies said content and a first terminal ID of a terminal that stores the content;

an inputting device configured to input a retrieving condition that specifies at least one information in the plural information relating to said content;

an obtaining device configured to obtain the meta information that includes the at least one information in said retrieving condition from the managing terminal having the second terminal ID stored in said memory;

a specifying device configured to specify said content ID based on the meta information obtained by the obtaining device, and configured to specify the first terminal ID of the terminal storing the content; and a transmitting device configured to transmit a request for obtaining the content relating to said content ID specified by said specifying device through said network to the terminal having the first terminal ID specified by the specifying device.

10. The content retrieving device according to claim 9, wherein said memory is further configured to store said second terminal ID, a copy of said meta information, and a state control information that is set to one of a first state and a second state, the first state indicating the copy of the meta information is equal to a newest meta information stored on the managing terminal having the second terminal ID and the second state indicating no copy of the meta information is equal to the newest meta information stored on the managing terminal having the second terminal ID, and said obtaining device is further configured to obtain said meta information from said memory instead of from the managing terminal having the second terminal ID when said control information is set to the first state.

11. The content retrieving device according to claim 10, wherein the content retrieving device further comprises:

a receiving device configured to receive notification information showing said second state from said managing terminal through said network; and a setting device configured to set the control information relating to said managing terminal among the control information stored to said memory to said second state when said notification information is received by the receiving device.

12. The content retrieving device according to claim 11, wherein the content retrieving device further comprises:

an obtaining device configured to obtain the newest meta information from said managing terminal through said network; and an updating device configured to update the meta information relating to said managing terminal among the meta information stored on said memory to the obtained newest meta information and configured to change said corresponding control information to said first state when the newest meta information is obtained by the obtaining device.

13. The content retrieving device according to claim 9, wherein said memory is also configured to store the meta information that includes the plural information relating to the content stored into the terminal to be directly managed, and is also configure to store the first identification information of the terminal storing these content with respect to the terminal to be directly managed, and said obtaining device is also configured to obtain the meta information that includes the at least one information in said retrieving condition among the meta information stored in said memory with respect to the terminal to be directly managed.

14. The content retrieving device according to claim 9, wherein the plural information in said meta information includes at least information showing a classification of the content relating to the meta information, information showing a title of the content, and information showing a file name of the content.

15. The content retrieving device according to claim 9, wherein the content retrieving device further comprises:

a receiving device configured to receive content relating to said request from the terminal transmitting said request; and a presenting device configured to present information relating to the content received by the receiving device.

16. The content retrieving device according to claim 9, wherein the meta information includes the first identification information of the terminal storing a copy or a digest of an identified content when the content relating to said meta information is the copy or the digest of the identified content, said obtaining device is further configured to obtain the meta information relating to said copy or digest when said identified content cannot be received by said receiving device although the request for obtaining said identified content is transmitted to the terminal storing said identified content by said transmitting device through said network, said specifying device is further configured to specify the first terminal ID of the terminal storing said copy or digest based on the meta information obtained by said obtaining device, and said transmitting device is further configured to transmit the request for obtaining said copy or digest to the terminal having the first terminal ID through said network.

* * * * *